United States Patent [19]

Kelley

[11] 4,019,027

[45] Apr. 19, 1977

[54] APPARATUS AND METHOD FOR SCHEDULE MONITORING AND CONTROL

[76] Inventor: William L. Kelley, 45 Ashbrook Place, Moraga, Calif. 94556

[22] Filed: May 9, 1975

[21] Appl. No.: 576,221

[52] U.S. Cl. .............................. 235/89 R; 35/24 A; 40/19.5; 58/151

[51] Int. Cl.² .................... G09B 19/18; G09F 3/18; G06C 3/00

[58] Field of Search ........... 35/24 A, 24 B; 40/19.5; 58/149, 151; 116/135; 235/89

[56] References Cited

UNITED STATES PATENTS

| | | | |
|---|---|---|---|
| 2,647,328 | 8/1953 | Ostrander | 35/24 A |
| 2,994,296 | 8/1961 | Waldin | 116/135 |
| 3,270,709 | 9/1966 | Berge | 116/135 |
| 3,492,812 | 2/1970 | Cimbal | 58/149 |

*Primary Examiner*—E. S. Jackmon
*Attorney, Agent, or Firm*—Stanley Bialos; Alvin E. Hendricson

[57] ABSTRACT

For the scheduling of activities, particularly construction activities by the Critical Path Method, an apparatus is provided with a mechanical simulation of the network associated with the method, and is adapted to support a network chart of activities and events. It has a progress bar for monitoring such activities and events, which is power driven at a constant rate for indicating the scheduled progress of the entire project at any given time, whereby the scheduler can determine at a glance at the board what adjustments, if any, need be made in the timing and progress of the various activities of the project.

11 Claims, 14 Drawing Figures

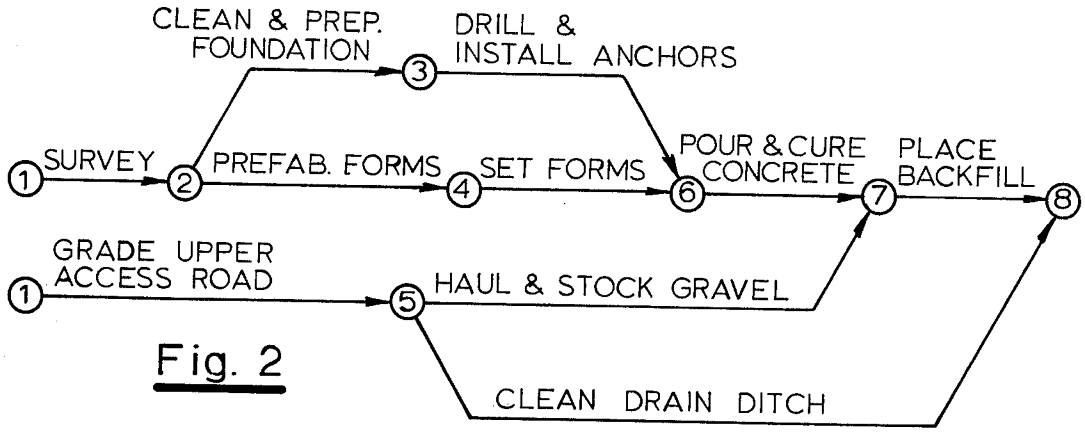
Fig. 2
Fig. 12
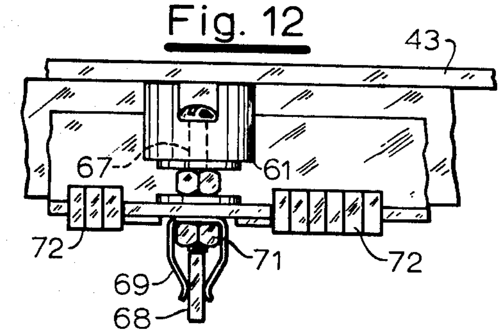
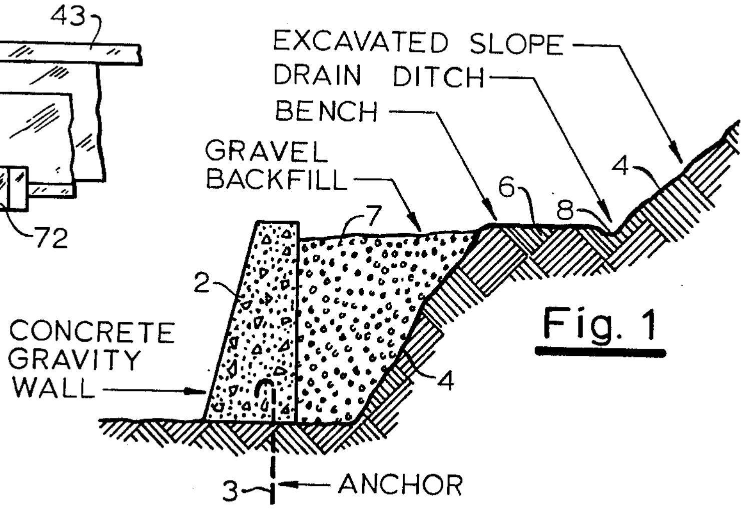
Fig. 1
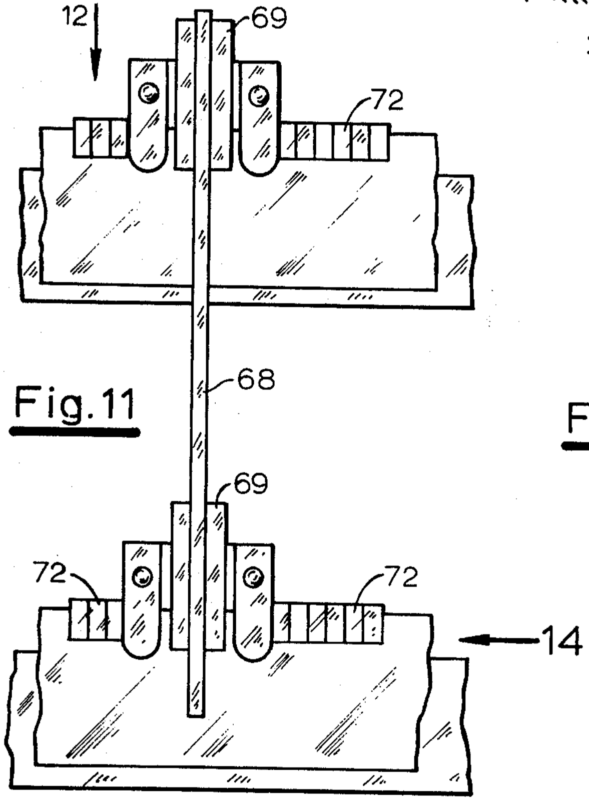
Fig. 11
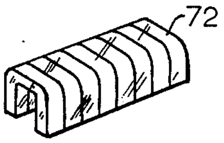
Fig. 13
Fig. 14
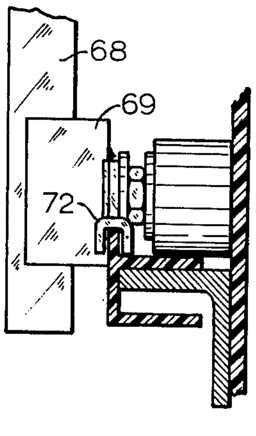

APPARATUS AND METHOD FOR SCHEDULE MONITORING AND CONTROL

BACKGROUND OF THE INVENTION

The critical path method (CPM) is a comparatively recent engineering development particularly adapted for use in the construction industry for the planning and scheduling of construction acitivities. For a detailed analysis of CPM, reference is made to the book entitled, CPM IN CONSTRUCTION MANAGEMENT, Second Edition, by James J. O'Brien, published by McGraw-Hill Book Company, Copyright 1971.

In construction projects there are activities which may be scheduled to start at certain events (times) and end at other events later on. An acitivity is a work item leading from or to an event; and an event is a point of time for completion or starting or an activity. In the CPM method, the activities are usually drawn on a chart indicated by lines or arrows and which start or terminate where two or more activities meet.

The engineers responsible for the particular scheduling of a project usually have a network chart of events and activities made up beforehand which is based on estimates. When reports from the field are received after the project has started, this network chart is examined regularly (which may be daily or weekly) to determine the progress of the entire project and of its individual activities, which is noted on the chart. If a critical activity is behind schedule, the Project Manager may employ additional resources (e.g. personnel or equipment), and from the chart he can tell whether the entire schedule has to be updated in order to complete it on time. This is a tedious job; and quite a complex one in situations where the project is complex.

In the invention hereof, a monitoring apparatus which will be described in detail hereinafter is provided whereby the project engineers or management in charge of the project may at a glance determine the status thereof so that they may take appropriate action when required.

TYPICAL EXAMPLE OF CPM

As background for explanation of CPM, the following typical example is illustrative. A scale network chart therefor, for the apparatus hereof will be explained later.

With reference to such example, FIG. 1 is a schematic sectional-elevation of a hypothetical project; and FIG. 2 is a network and activity schedule chart drawn for such example. The project of the sample comprises construction of a concrete. gravity wall 2 anchored at 3 near the toe of an excavated slope 4 on which a bench 6 exists, and back filled with gravel 7 between the slope and wall 2 up to the elevation of bench 6 in order to provide a widened road at such elevation. Drain ditch 8 is provided adjacent to the slope and the bench.

Conditions require that the project must be completed within a maximum period of 140 calendar days, including a 15 day contingency allowance for foul weather. Excluding the 15 day allowance for such foul weather, the schedule is 125 calendar days. With these limitations in mind, the management develops a network with activity data for the project on a calendar day basis. The activity data are hand calculated but complex networks often justify computer assistance.

FIG. 2 illustrates the CPM activity and event network for the example of FIG. 1, which is drawn after the activities are determined and their durations estimated by the personnel in charge. In the FIG. 2 network, the activities indicated by straight lines with arrows and the events indicated by numbered circles, are not drawn to a time scale. This is done later when a time bar chart or schedule used in this invention is made up. It will be described later.

The following is a table of activities and events of the FIG. 2 network, as estimated by the management:

| Event Interval | Activity | D | ES | EF | LS | LF | F |
|---|---|---|---|---|---|---|---|
| 1 - 2 | Survey | 5 | 0 | 5 | 0 | 5 | 0 |
| 1 - 5 | Grade Upper Access Rd. | 40 | 0 | 40 | 35 | 75 | 35 |
| 2 - 3 | Clean & Prep. Foundation | 14 | 5 | 19 | 11 | 25 | 6 |
| 2 - 4 | Prefabricate Forms | 40 | 5 | 45 | 5 | 45 | 0 |
| 3 - 6 | Drill & Install Anchors | 55 | 19 | 74 | 25 | 80 | 6 |
| 4 - 6 | Set Forms | 35 | 45 | 80 | 45 | 80 | 0 |
| 5 - 7 | Haul & Stock Gravel | 30 | 40 | 70 | 75 | 105 | 35 |
| 6 - 7 | Pour & Cure Concrete | 25 | 80 | 105 | 80 | 105 | 0 |
| 5 - 8 | Clean Drain Ditch | 15 | 40 | 55 | 110 | 125 | 70 |
| 7 - 8 | Place Backfill | 20 | 105 | 125 | 105 | 125 | 0 |

D - Duration
ES - Early Start
LS - Late Start
F - Float
EF - Early Finish
LF - Late Finish The activities are listed in a column and are indicated between event numbers. The duration of the entire project is estimated at 125 days as was indicated previously. The estimated duration of each activity in project days is indicated in column D. ES designates teh estimated earliest possible start which can be made for any particular activity determined from the time the project is commenced; LS the latest possible estimated start without delaying the entire program; EF the estimated earliest possible finish of an activity; LF the latest possible estimated finish without delaying the entire program; and F represents float time in project days.

With respect to float, it should be kept in mind that certain activities are not critical, and therefore they will not interfere with completion of the project if the activity is not started or finished within a reasonable time. However, certain activities are critical and have no spare time or float. For example, the "Survey" (1 - 2) must be completed before the two activities "Prefabricate Forms" (2 - 4) and "Clean and Prepare Foundation" (2 - 3), which lead from (1 - 2), can be started. Also, as a further example the activity "Prefabricate Forms" (2 - 4) must be completed before the activity "Set Forms" (4 - 6) can be started. If critical activities, such as 1 - 2, 2 - 4, or 4 - 6 are completed after latest finish (LF) times, the entire project will be delayed.

There are various ways in which "Float" can be calculated. It can be determined by the formula F - LF - EF; or LS - ES; or LF - ES -D.

Those activities which have no float time (zero float) are critical because they must be completed in the scheduled time if the project is not to be delayed. Those which have very little float in days are considered near critical. A near critical acitivity may be considered one in which the float is within about 10% of the calculated duration of the entire project. The more float there is in an activity, the less critical such activity becomes; and as previously explained, the entire project may be delayed if a critical activity is not started or completed in time. Near critical activities are usually considered the same as critical to provide a factor of safety.

From the above, it will be noted that the critical and near critical activities of the illustrative Example are 1 - 2; 2 - 4; 3 - 6; 4 - 6; 6 - 7; and 7 - 8. Of these, activities 1 - 2; 2 - 4; 4 - 6; 6 - 7; and 7 - 8 comprises the critical path which is defined as the longest route through the CPM network.

SUMMARY AND OBJECTS OF THE INVENTION

Summarizing the invention hereof, it comprises performing the usual CPM estimates and calculations for a particular project as explained above, and making a scaled network chart or schedule in time-bar form, on which the events are plotted at their calculated early start (ES) positions. In cases in which two or more activities share the same total float, this float may be distributed among the affected activities. Thus in the example herein shared float is allocated equally to Activities 2 - 3 and 3 - 6. Therefore the scheduled start of Activity 3 - 6 is 3 days later than its early start, or Day 22.

An apparatus is provided which has a hinged front panel, advantageously transparent, on which the network schedule is mounted. Markers in the form of discs or buttons for various events are removably positioned at the front of the schedule at the various event positions. The markers are of magnetic material, and are held in position by magnets movably supported at the back of the panel so that the markers can be shifted by manually shifting the magnets.

A vertical indicator bar is mounted for movement along the panel, and is moved continuously by a clock driving mechanism which is timed for the entire calculated project. The chart has a horizontal scale drawn thereof which indicates in calendar days as read by the position of the indicator bar, the number of days the project has progressed as scheduled. Horizontal scales are drawn parallel to various activity lines and indicate the estimated percent completion of the respective activities as determined by the position of the indicator bar. Thus, by noting the position of the indicator bar with reference to the activity scales, the Project Manager in charge (who usually must depend on information conveyed to him by subordinates or have to wade through a mass of written reports or data) can by himself determine at a glance the overall progress of the project as compared to the scheduled progress. In this connection, the actual progress of any particular activity can be estimated and recorded on the schedule at any particular time by means of a marking pen. Desirably, such marking pen is provided for each critical or near critical activity on the critical path; and means is provided to hold the marking pen and move it manually along the chart.

Should it be found at any particular time that a critical or near critical activity is behind schedule, job management can readily recognize this from the position of the indicator bar of the apparatus with reference to the estimated actual progress, and take appropriate action such as by adding more personnel to work on the activity. For example, should it be noted that activity "Prefabricate Forms" (2 - 4) is substantially behind schedule even after increased personnel has been employed to work on this activity, the entire project can be rescheduled by rescheduling one or more of the succeeding critical activities for shorter duration or durations, or accept the lost time as probably unrecoverable. If the latter is opted, means is provided on the apparatus for prolonging and updating this schedule, for example, by increasing the overall duration time.

For the purpose of updating or adjusting the event markers, means is provided at the rear of the schedule control panel for manually simultaneously shifting all of the critical event markers at one time so that they need not be individually shifted. This is done by interconnecting such event markers so that when one of the critical markers is shifted, the ones interconnected therewith are also shifted. Shifting of the event markers to update the schedule results in altering the "Float" of the non-critical activities.

From the preceding, it is seen that the invention has as its objects, among others, the provision of an improved simple method and apparatus for determining at a glance the status of any particular project which is programmed by the critical path method, which is simple to operate and perform, and economical. Other projects will become apparent from the following more detailed description and accompanying drawings, in which:

DESCRIPTION OF DRAWINGS

FIGS. 1 and 2 have been previously described.

FIG. 11 is a fragmentary rear elevation view illustrating a form of vertical connection between magnet mechanism, looking at the marker 6 portion of the apparatus in FIG. 3;

FIG. 12 is a fragmentary top plan view of the portion of the mechanism shown in FIG. 11, looking in the direction of arrow 12 in FIG. 11;

FIG. 13 is a isometric view of a type of spacer bar between magnet mechanism; and FIG. 14 is a fragmentary end elevation, looking in the direction of arrow 14 in FIG. 11.

DETAILED DESCRIPTION

As was noted previously, after the activities have been determined and outlined as indicated in FIGS. 1 and 2, and by the table for FIG. 2, the time bar chart or schedule of the entire project is drawn to scale for various duration times. A suitable scale may be:

| Scale | Schedule Duration Range |
|---|---|
| 0.1 in. = 1 day | 1 to 2 yrs. |
| 0.2 in. = 1 day | 6 mos. to 1 yr. |
| 0.4 in. = 1 day | 6 mos. or less |

For schedules longer than two years' duration or should it be desired to use a larger scale, two or more monitoring boards or panels may be employed, or the schedule may be divided into two or more successive networks.

A suitable paper size for the schedule is about 40 by 84 inches; and it has been found that lines of activities which extend horizontally should be spaced about 3 inches apart vertically. The board may be of any suitable vertical height to accommodate the activity lines spaced apart vertically; a suitable number being about 10 to 12. Shared float among the activities where this occurs is distributed by allocation.

Figure 3:
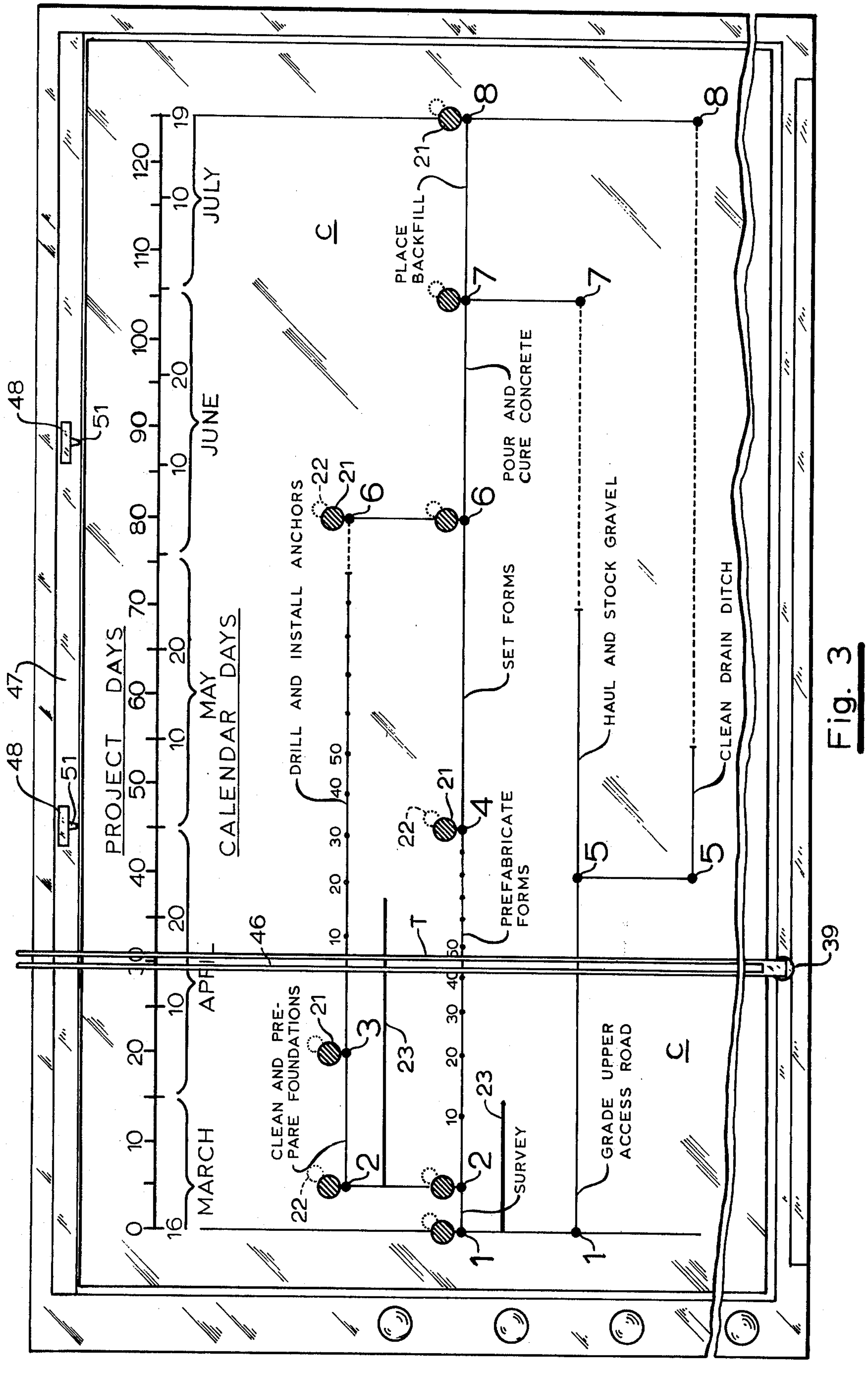
FIG. 3 is a more or less schematic front elevation of the apparatus with the CPM scale chart thereon, drawn from the information illustrated in FIGS. 1 and 2; the view looking in a direction of line 3 — 3 in FIG. 6.

FIG. 3 is a schedule of the project previously explained, drawn from the data depicted in FIG. 1 and 2. Events for critical and near critical activities are indicated by circles but non-critical activities are shown on the chart solely to complete the network and to enable overview thereof. It will be noted from FIG. 3 that the activities follow the order indicated in the aforementioned table. Where more than one activity terminates or originates from an event, such events are separated vertically on the schedule. Float times for non-critical activities are indicated by dotted lines. A scale in calendar days is drawn on the chart indicating the date of termination (duration). This same scale also indicates the estimated duration of the project (project days), commencing with 0 start and ending at the estimated end of the project (125 days).

The activity lines between events are scaled to indicate the estimated duration of the respective activities divided into estimated percentage of scheduled completion of the particular activity at any particular time during its estimated duration determined with reference to the position of the indicator bar. Thus, it will be noted for example that the activity "Drill and Install Anchors" (3 - 6) having an original estimated duration of 55 days is divided into increments indicating percent completion. These are estimated for all activities by the project management as previously related; and it will be observed that the spacing for the percentages decreases with time on the theory that as work on the activity progresses, the personnel become more familiar with it and can work more efficiently at the end than at the start of the project. A time bar *T*, to be described later, on the apparatus is provided which is moved by clock drive mechanism to indicate scheduled progress of the project in calendar days.

As will be described later in greater detail when the apparatus structure is described, the prepared schedule or chart is mounted on a panel; and means is provided for removably positioning critical or near critical event markers 21, which are in the form of discs, at the points such events had been calculated to occur. For example, event 2 occurs after the "Survey" (1 - 2) has been completed, which is 5 days after commencement of the project, and the marker therefor is positioned at such point. The marker for event 3 is placed at a position 14 days after event 2, etc. For clarity, these event markers 21 are schematically illustrated in FIG. 3 in offset relationship with reference to the event points, and are desirably illuminated as indicated by the dotted circles 22 in FIG. 3. As will be described later, the markers are held by magnetic means at the back of the panel.

Also, means is provided for recording the overall progress of each of the critical or near critical activities by providing a recorder which is moved manually along the panel and draws a recorder line 23 adjacent the activity line. This record is made by the management based upon an estimate of how the work for such activity has progressed. Instead of providing such recorder on the schedule itself, the same effect may be obtained by the Project Manager, by drawing the line on the schedule by a hand held pencil or pen.

As illustrative of how the schedule is used in the apparuats, assume that on Apr. 15, 30 days after the project start, the panel and board control schedule appear after examination as shown in FIG. 3. It will be noted that the project is in difficulty because critical activity 2 - 4 is behind schedule 15 days. This is ascertained from the fact that the time bar *T* is at 30 project days at which the activity should be about 45% completed, but the actual completion, as indicated by record line 23 just below activity line 2 - 4, is only about 10% which should have occurred about 15 days after the project commenced instead of 30 days. Therefore, management has to make a decision whether to prolong the completion date of the project or to recover lost time.

Assuming that a decision is made to add a carpenter crew in order to increase the production rate of prefabricating the forms (activity 2 - 4), and after this is done the activity is still behind schedule by 10 days, then management must make another decision of whether to reschedule one or more of the succeeding critical activities for shorter duration or durations. or accept the lost time as probably unrecoverable. The desirable form of apparatus will now be described, including its means for rearranging the schedule or timing by prolonging of updating it.

Referring to FIGS. 3 through 14 which illustrate the apparatus structure, it comprises a support frame 24 of rectangular box shape having vertical flanges 26 which form sides channel-shaped in cross section. Outwardly extending lugs 27 having apertures 28 provide means for attaching the frame to a suitable support such as a wall or easel. Frame 24 houses an inner frame structure 29 which carries apparatus components and which it pivotally or hingedly connected along one side edge thereof by means of hinge 31 to a side flange of frame 24. Frame 29 provides a support for the chart and also for driving means for indicator bar T which is mounted on frame 29. The rear of frame 24 is covered by detachably connected backing panel 30.

Figure 6:
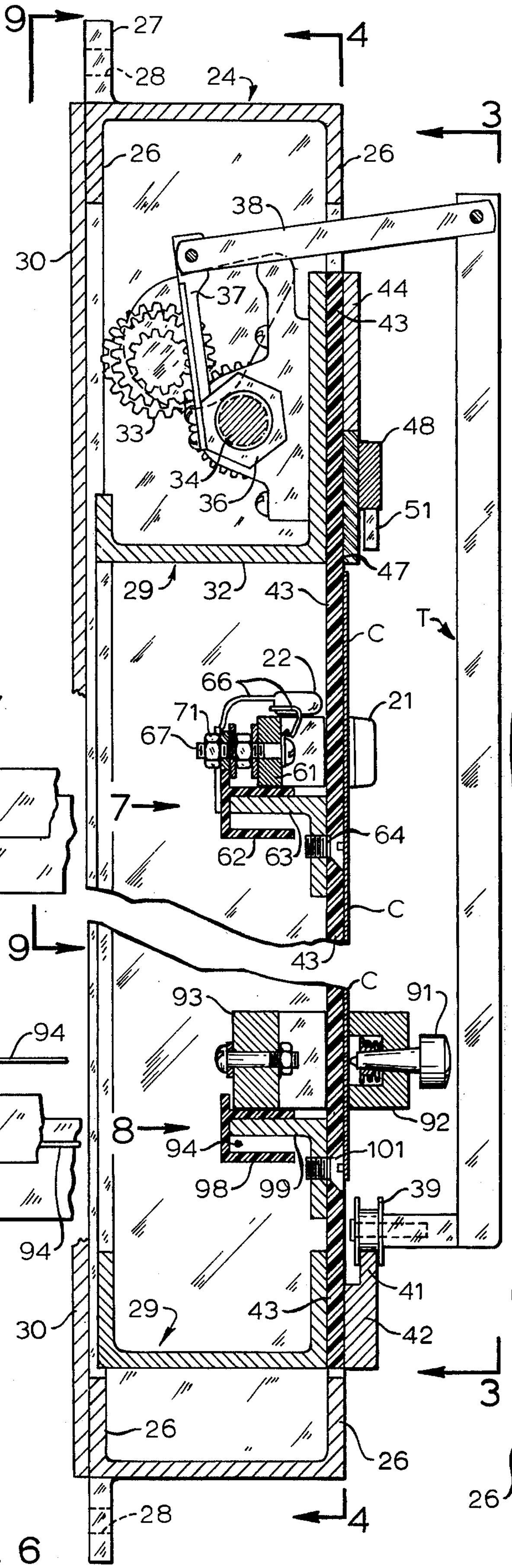
FIG. 6 is a transverse vertical section taken in a plane indicated by line 6 — 6 in FIG. 5.
Figure 5:
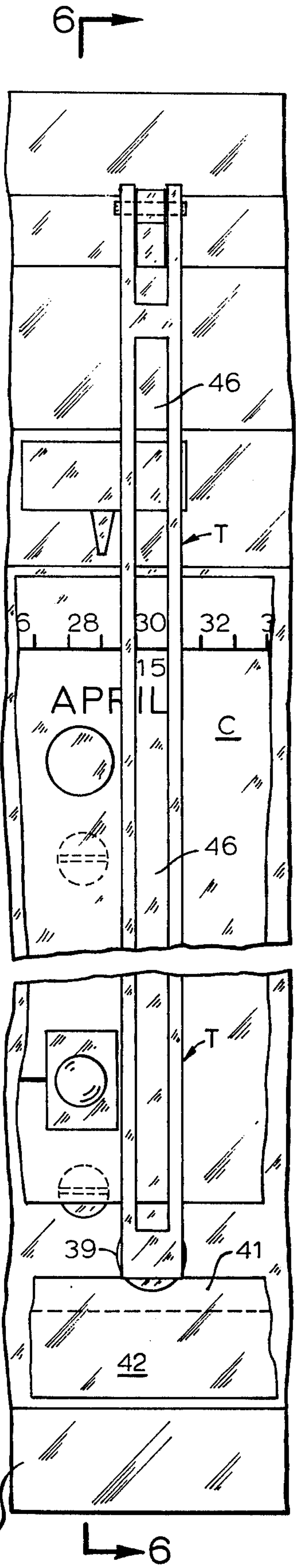
FIG. 5 is a fragmentary front elevational view of the apparatus looking at an indicator bar portion thereof.
Figure 10:
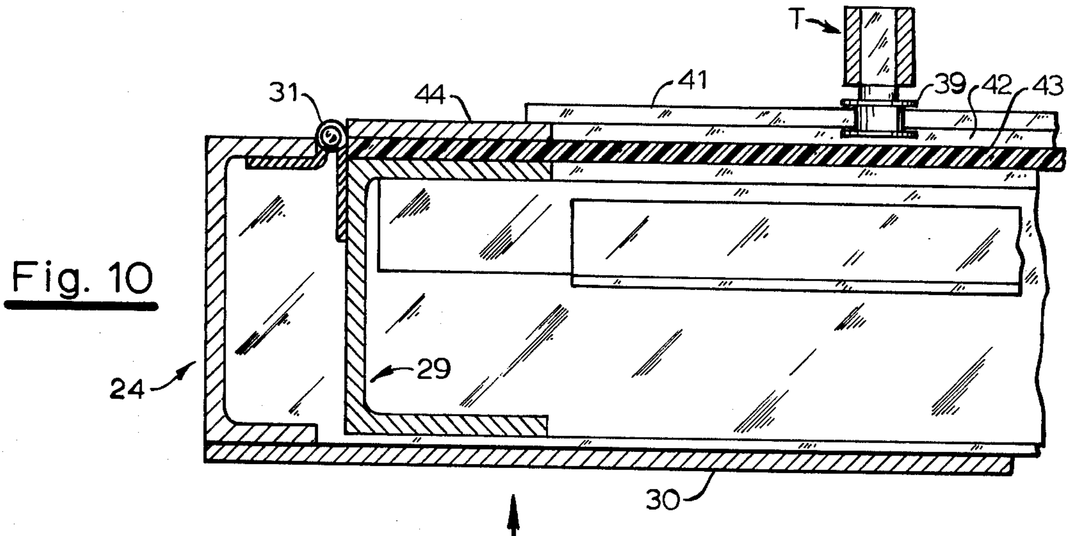
FIG. 10 is a fragmentary horizontal section taken in a plane indicated by line 10 — 10 in FIG. 9.
Figure 9:
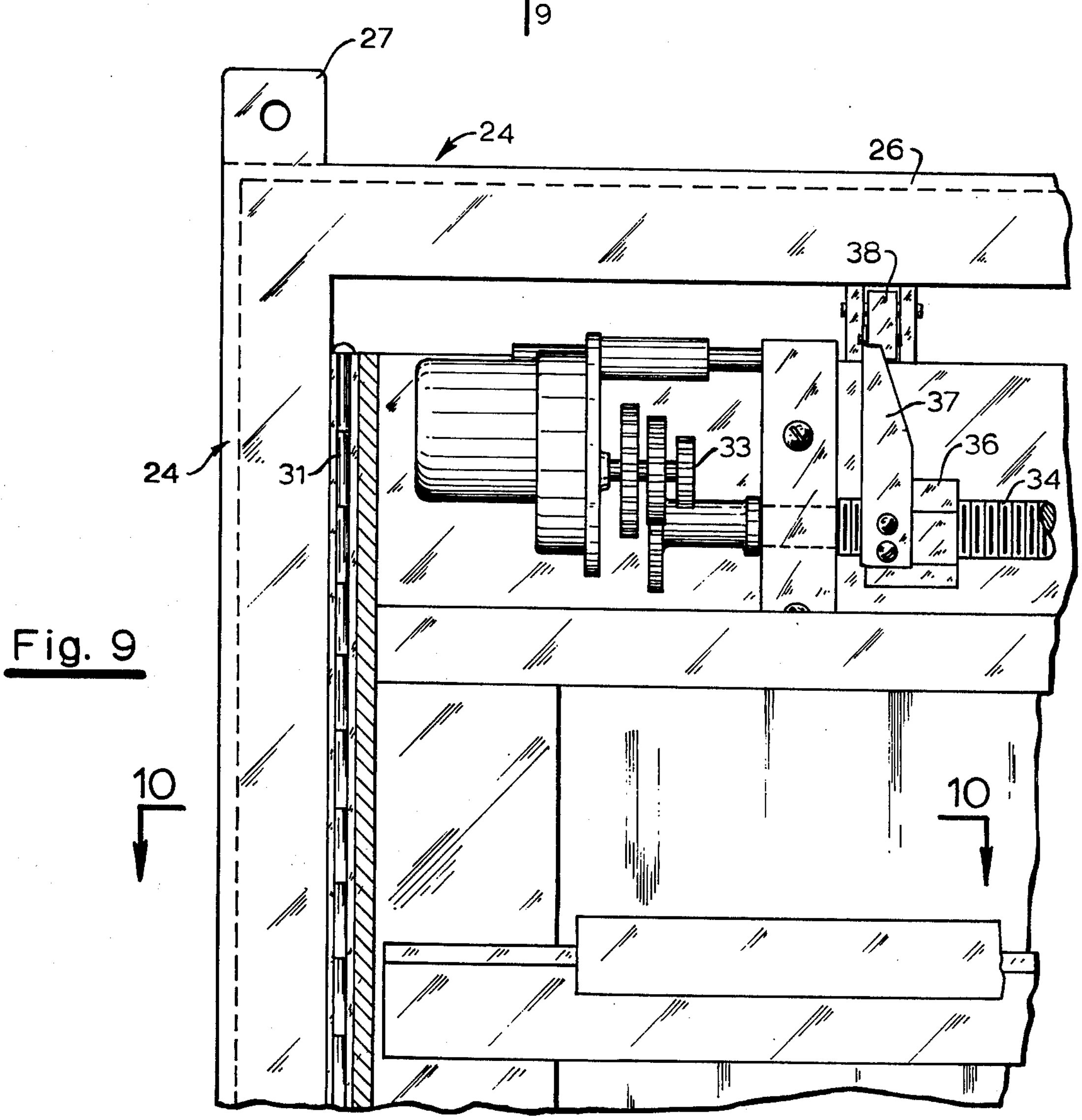
FIG. 9 is a fragmentary rear elevation of the apparatus looking in the direction of arrow 9 in FIG. 10, with a back cover panel removed to illustrate the support frame arrangement and drive mechanism for the indicator bar, and with a portion of the structure shown in section to illustrate the construction more clearly.

As can be seen best from FIGS. 6 and 9, frame 29 has an upper horizontal channel 32 above which is mounted clock drive gearing 33 connected to drive a screw 34. A nut 36 on screw 34 is attached to an upstanding link 37 to which is pivotally connected a link 38 which is turn is pivotally connected to the top end of indicator bar T. As the clock gearing 33 is driven, indicator bar T is moved longitudinally along the chart at a constant rate. In this connection, gearing 33 comprises replaceable speed changed gearing so that the rate may be fixed in accordance with the scale of the chart desired.

The lower end of indicator bar T carries a freely journalled rotatable roller 39 which rides on a rail 41 forming part of a bar 42 secured to the bottom of frame 29. Bar 42 also attaches a light transmitting support panel 43 (desirably of plastic material, such as "Plexiglas") to inner frame 29; suitable additional bars 44 also being provided to secure light transmitting panel 43 to frame 29. The aforementioned pivotally connected link 38 spaces indicator bar T away from panel 43 and away from the schedule chart C which is attached to panel 43 by any suitable means such as "Scotch Tape" along its edges. The chart is desirably of light transmitting material, such as tracing paper or the like.

For ease of reading, indicator bar T is formed with a longitudinally extending open narrow space 46 through which indicia on the scales may be more readily seen. A longitudinally extending bar 47 of magnetic material is provided above chart C upon which so-called milestone event markers are removably positioned, each comprising a magnet 48 and a pointer 51. Milestone events are those of special importance.

As was previously related, event markers 21 are of magnetic material. They are removably held over the desired critical or near critical events. Means for movably retaining markers 21 for freely slidable movement along the chart C when desired, comprises magnets 61 each of which is supported on an insulating U-shaped track member 62, desirably of plastic material, in turn mounted on an angle member 63 secured to light transmitting panel 43 by countersunk screws 64. Because each magnet 61 is supported for slidable movement along the track, it may be readily positioned at a desired event point on the chart at which an event marker 21 may be held by the magnet.

Each magnet 61 supports the aforementioned light source 22 which illuminates the associated marker 21 by light transmitted through transparent support panel 43. Light transmitting panel 43 also serves to allow the scheduler to see where to set up the magnets 61 in desired positions to hold markers 21. All the light sources, desirably electric light bulbs 22, are connected by any conventional circuitry including wires 66 suitably insulated from the magnets and held in position by bolts 67.

Figure 4:
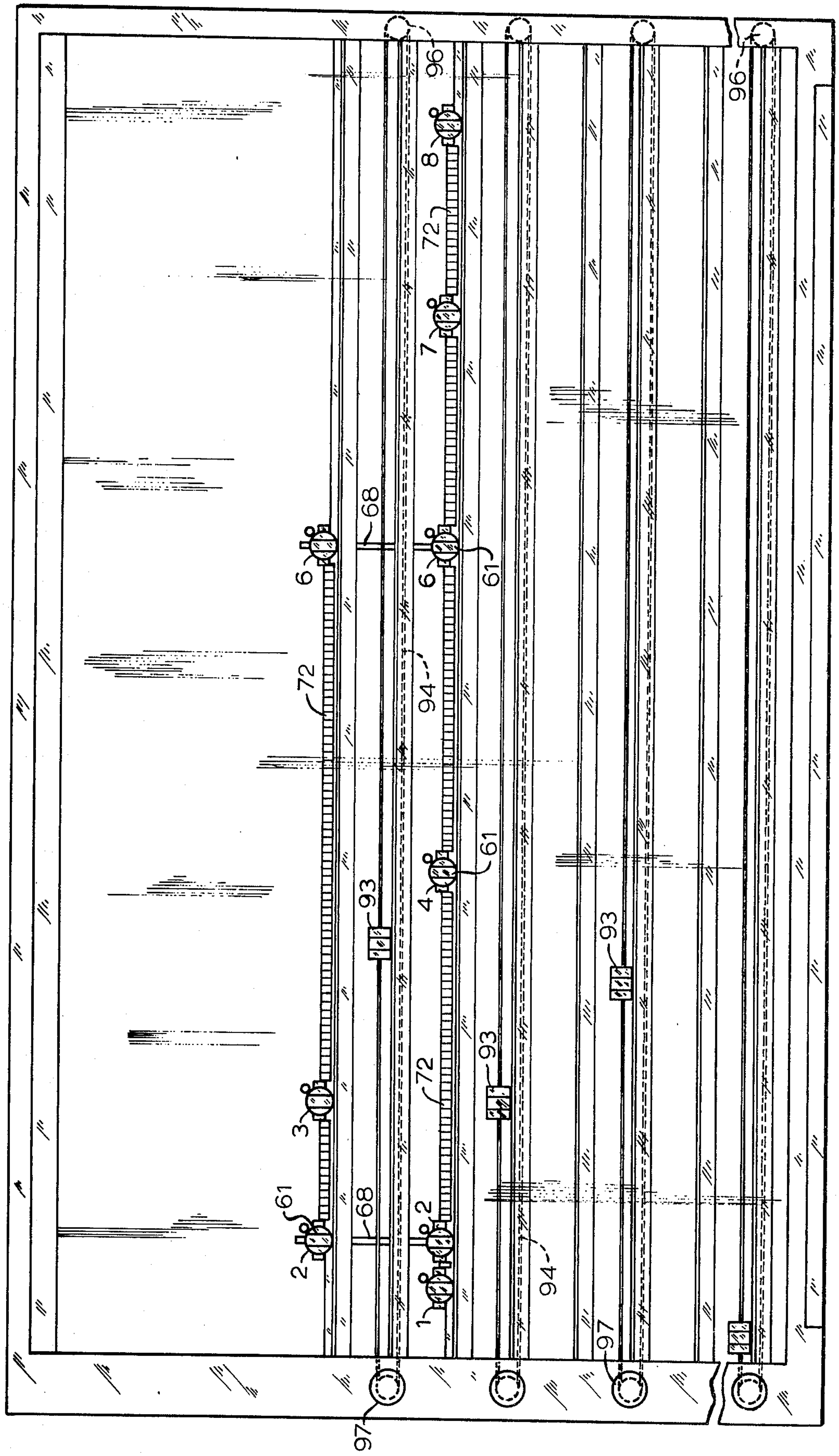
FIG. 4 is a front elevation of a light transmitting panel for mounting the CPM chart, and which is mounted on a hinged frame of the apparatus, with the chart, the indicator bar and event marker discs of magnetic material omitted to illustrate the construction more clearly; the view looking in the direction of line 4 — 4 in FIG. 6, with parts o the apparatus in the same relationship as shown in FIG. 3.
Figure 7:
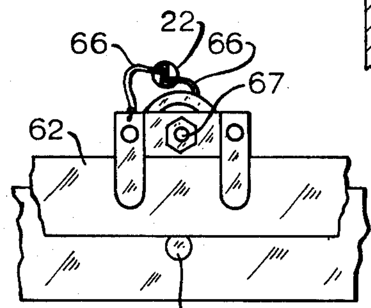
FIG. 7 is a fragmentary rear elevation of the magnet arrangement for holding or retaining event marker buttons; the view looking for holding or retaining event marker buttons; the view looking in the direction of arrow 7 in FIG. 6.

As was previously noted, where two or more activities start from the same event, a plurality of rows of vertically displaced event markers is provided such as 2 - 2 and 6 - 6 shown in FIGS. 3 and 4. In order that the vertically spaced magnets for such events may be shifted in unison together, they are rigidly connected together by a connecting bar 68, as can be seen from FIGS. 11, 12 and 14. For attaching the bar to a magnet, a U-shaped clip 69 is fastened to the magnet structure by a nut 71 which cooperates with bolt 67. The clip rigidly clamps the bar so that two of the magnet structures, one above the other, can be manually moved laterally in unison when desired.

In revising (updating) the schedule for reasons previously explained, a plurality of magnet structures is manually shifted or moved to the right or left with reference to FIGS. 3 and 4. They are so interconnected that all of them that are to be shifted can be simultaneously moved in unison merely by pushing one of the magnet structures from left to right or vice versa, thus updating the schedule by prolonging or shortening it, respectively. Means for effecting such shifting includes readily convenient structure for initially properly spacing the magnets apart when the apparatus is first set up, so that the event markers 21 retained by magnets 61 will be properly spaced apart.

For such purpose, a premanufactured conventional bundle 72 of individual staples adhesively secured together edge to edge is most suitable because the bundle can be readily adjusted to the desired length by removing staples or by combining bundles. When so adjusted to space two event markers apart for example 4 – 6 as shown in FIG. 4, it will maintain the desired spacing whereby all of the markers in advance of a selected marker may be moved in unison merely by manually pushing a selected magnet structure which retains the marker. The magnet structures which are connected together by an upright bar 68 will also be shifted simultaneously. Not only do the bundles 72 act as spacers, but they are desirably of metal so that they can form part of the illumination circuity which also includes aforementioned wires 66.

The structural mechanism has been described which relates to monitoring the actual progress of critical or near critical activities so as to relate them to the scheduled progress as forecast at the beginning when plans were initially made by the management. Accordingly actual progress as recorded on the chart from field reports can be compared readily at any time with scheduled progress shown by the indicator bar T.

Desirably, the aforementioned record line 23 should be drawn indicating the actual progress of the respective particular activities at the time. Line 23 may be drawn from time to time on the chart by hand held pencil or pen. However, recording means is provided forming part of the apparatus to enable drawing of such line conveniently.

Figure 8:
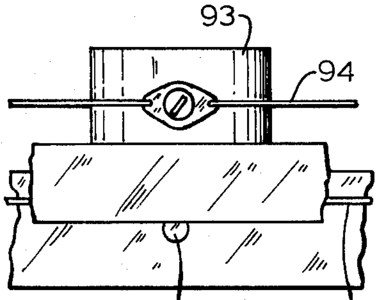
FIG. 8 is a fragmentary rear elevation of a magnet structure for holding recorder mechanism, looking in the direction of arrow 8 in FIG. 6.

Such recording means, as can be seen best from FIGS. 6 and 8, comprises a spring pressed writing instrument 91 slidably mounted on a button magnet 92 which is pressed against chart C by the spring. Magnet 92 is fixedly held against the chart by means of a cooperating horeshoe magnet 93 which is secured to an endless flexible strand 94 which runs about a pulley 96 at one end and about a pulley 97 at the opposite end having a manually controllable knob by which pen 91 may be moved across the chart. Magnet 93 can slide along insulating track 98 adhered to angle member 99 which supports the track; angle member 99 being secured to the transparent panel 43 by means of countersunk screws 101.

I claim:

1. Schedule control and monitoring apparatus for use in network type scheduling of a project having a plurality of interrelated activities with events at the start and termination thereof and wherein a succession of activities of the longest time path for the project are critical, said apparatus comprising a support frame, means for mounting on said frame a prepared chart on which a network schedule of such activities and events is written chronologically with the distance of consecutive critical activities drawn to scale representing scheduled times based on estimates of the durations to complete the respective activities, a plurality of magnets movably disposed on said frame behind said chart whereby the positions thereof can be changed, a plurality of markers of magnetic material adapted for disposition on the front face of said chart at said event points and supported by said magnets, an indicator bar mounted on said frame over said chart, and means for moving said indicator bar at a constant rate past said markers from a position indicating the commencement of the project to provide a comparison between the actual progress of any given activity and the scheduled progress thereof.

2. The apparatus of claim 1 wherein means interconnects a plurality of said magnets for simultaneously shifting said magnets together along said chart when the schedule is to be changed.

3. The apparatus of claim 1 further comprising a plurality of recording instruments for various respective activities; each of said instruments being mounted on a body of magnetic material at the front of the chart, a magnet for each of said bodies disposed at the back of the chart for retaining said respective body and pressing the instrument thereof against chart, a track on which each magnet is slidably mounted, and manual means including a control knob for sliding said magnet along said track.

4. The apparatus of claim 3 wherein said manual sliding means includes an endless flexible member to which the magnet is attached.

5. The apparatus of claim 1 wherein the support frame includes a panel of light transmitting material to which the chart is attached at the front side of the panel, the magnets are slidably mounted on tracks at the rear side of the panel, and means carried by respective magnets is provided to illuminate and respective marks supported thereby of events at the start and termination of critical activities.

6. The apparatus of claim 2 wherein said support frame includes a panel to which the chart is attached at the front side of the panel, means is provided for spacing the indicator bar to clear said markers as the indicator bar moves, means is provided for mounting said panel for hinged movement along one edge about an upright axis to allow the panel to be swung for access to the interconnected magnets at the rear of said panel, and the means spacing said indicator bar to clear said markers includes linkage connected to the top of the bar for pivotal movement about a horizontal axis.

7. The apparatus of claim 6 wherein a track at the bottom of the panel is provided, and a roller is journalled at the bottom bar rides on said track.

8. Schedule control and monitoring apparatus for a critical path method project which has a succession of activities some of which are critical whereby they must be completed on time if the project is not to be delayed and also comprising events which are times at which activities start or terminate, said apparatus comprising a support frame including a transparent panel, means mounting on the front face of said panel a prepared chart on which a network schedule of such activities and events is written chronologically with the distance between consecutive critical activities drawn to scale representing scheduled times based on estimates of the durations to complete the respective activities, magnets slidably mounted at the rear face of said panel for respectively supporting a plurality of markers of magnetic material on the front face of said chart at event points, means interconnecting a plurality of said magnets for simultaneously shifting said magnets along said chart when the schedule is to be changed, an indicator bar mounted on said frame over said chart, and means for moving said indicator bar at a constant rate past said markers from a position indicating the commencement of the project to provide a comparison between the actual progress of any given activity and the scheduled progress thereof.

9. A schedule control and monitoring method for use in network type scheduling wherein a plurality of interdependent activities culminating in events of a project are to be scheduled and monitoring during progress of the project comprising the steps of:

providing a chart on which a network schedule of activities and events of the project are presented chronologically with the distance between consecutive events drawn to a time scale respresenting scheduled times for performance of activities based on estimates of the durations thereof, mounting said networks chart upon a front face of a panel, forming a mechanical counterpart of the network of said chart on the back face of said panel by placing magnets at the locations of said events on the chart and mechanically linking the magnets between the events as related on the chart, placing a magnetically responsive marker on said chart at each event and supporting said markers by said magnets, drawing lines indicating the actual progress of said activities on the chart to the scale thereof, and moving an indicator bar at a constant rate related to the scale of the chart across the front face of said panel over said chart to provide a visual comparison of actual progress of the project to estimated times of completion of activities thereof.

10. The method of claim 9 further defined by providing illumination at each magnet, and electrically and mechanically linking said magnets in the manner events are connected on the chart and connecting said electrical linkage across a power supply whereby only markers located at events of a critical longest path of activities of the project are illuminated to visually depict the critical path of the project.

11. The method of claim 10 further defined by elongating the linkage between magnets corresponding to markers at the beginning and end of activities which are not to be completed in estimated times to thus reposition magnets and markers on said chart for illuminating the markers of events of an adjusted longest critical path of activities to provide a visual indication of adjusted network schedule and comparison to original network schedule and actual activities progress.

* * * * *